United States Patent [19]
Pierron et al.

[11] Patent Number: 5,884,697
[45] Date of Patent: Mar. 23, 1999

[54] APPARATUS FOR INDEPENDENTLY REGULATING THE HEATING ON THE TWO SIDES OF THE CABIN OF A VEHICLE

[75] Inventors: Fréderic Pierron, Le Mesnil St. Denis; Daniel Virey, Les Essarts le Roi; Pascal Cloteaux, Versailles; Jérôme Robillard, Le Mesnil St. Denis, all of France

[73] Assignee: Valeo Climatisation, La Verriere, France

[21] Appl. No.: 828,968

[22] Filed: Mar. 27, 1997

[30] Foreign Application Priority Data

Mar. 28, 1996 [FR] France ................................ 96 03895

[51] Int. Cl.⁶ .............................. F25B 29/00; B60H 1/04; B60H 1/10
[52] U.S. Cl. ............................. 165/203; 165/42; 165/43; 165/297; 165/50; 237/12.3 A; 237/12.3 B
[58] Field of Search ................................ 165/42, 43, 203, 165/297, 50; 237/12.3 B, 12.3 A

[56] References Cited

U.S. PATENT DOCUMENTS

| | | | |
|---|---|---|---|
| 4,417,688 | 11/1983 | Schnaibel et al. | 165/203 |
| 5,184,773 | 2/1993 | Everingham | 237/12.3 B |
| 5,273,105 | 12/1993 | Higashihara et al. | 237/12.3 B |

FOREIGN PATENT DOCUMENTS

| | | | |
|---|---|---|---|
| 0 128 808 | 12/1984 | European Pat. Off. | |
| 26 51 232 | 5/1978 | Germany . | |
| 3916164 | 11/1990 | Germany | 237/12.3 B |
| 39 16 166 | 12/1990 | Germany . | |
| 2 062 216 | 5/1981 | United Kingdom . | |
| 2245967 | 1/1992 | United Kingdom | 165/50 |

Primary Examiner—John K. Ford
Attorney, Agent, or Firm—Morgan & Finnegan, L.L.P.

[57] ABSTRACT

Two stop valves, associated with bypass ducts containing energy absorbing devices, enable an adjustable fraction of the hot fluid to be diverted past left and right hand heating radiators, so that any change in the adjustment of the fluid flow in either of the radiators has no effect on the fluid flow in the other radiator.

9 Claims, 1 Drawing Sheet

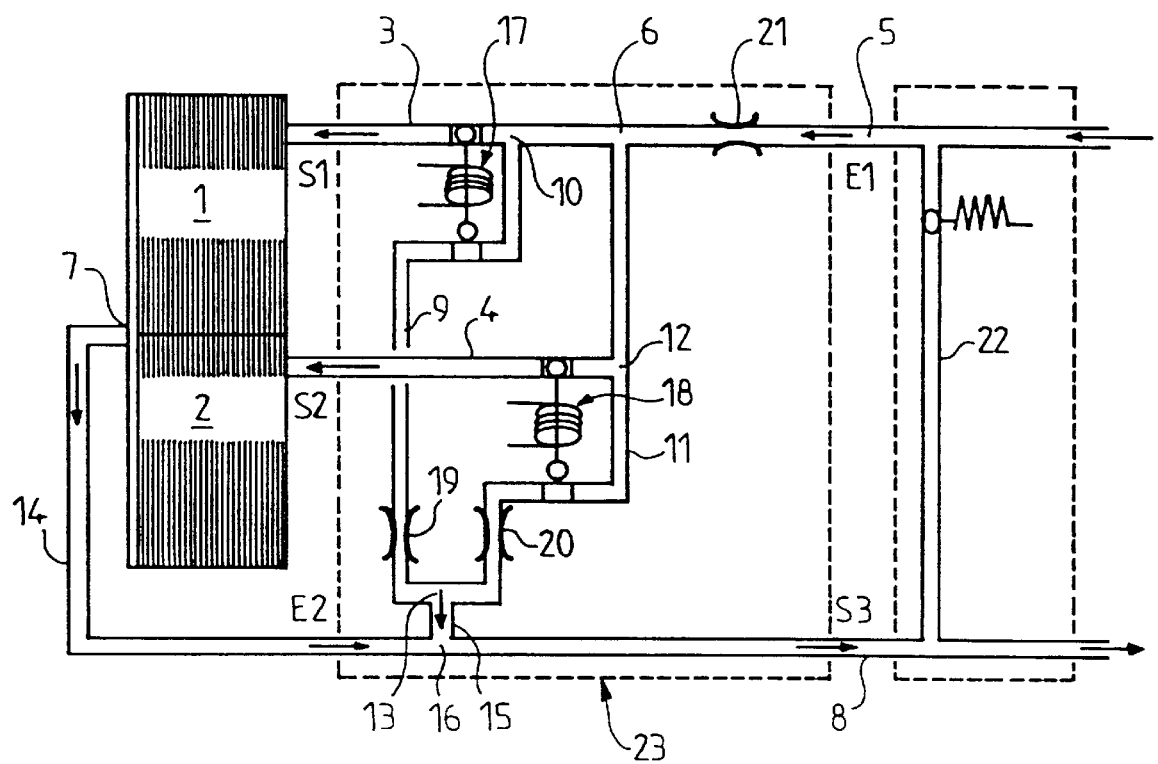

APPARATUS FOR INDEPENDENTLY REGULATING THE HEATING ON THE TWO
SIDES OF THE CABIN OF A VEHICLE

FIELD OF THE INVENTION

This invention relates to apparatus for heating or air conditioning the cabin of a vehicle, where the apparatus includes two heat exchangers through which two respective streams of air are passed, these streams being subsequently taken to different regions of the cabin, the streams of air being in heat exchange contact with a hot fluid flowing in two branches, connected in parallel in the circuit and in which the heat exchangers are respectively mounted, the apparatus including means for regulating the flow rate of the hot fluid in each of the branches in accordance with a setting representing a desired temperature for the corresponding stream of air.

BACKGROUND OF THE INVENTION

Apparatus of the above kind is employed, in particular, for enabling separate adjustments to be made in the temperature of the two streams of air which are to be delivered, one into the left hand half and the other into the right hand half of the cabin of the vehicle, according to the respective requirements of the driver on one side of the cabin and a passenger on the other side. In these known forms of apparatus, when the flow of fluid in one of the heat exchangers increases, the amount of fluid available for flow in the other heat exchanger diminishes, and vice versa. As a result, any change in the adjustment relating to one side of the cabin has the secondary effect of also changing the temperature of the air on the other side of the cabin.

DISCUSSION OF THE INVENTION

The object of the invention is to overcome this drawback, and to enable the temperature on each side of the cabin to be regulated in a way such that it is entirely independent of the temperature on the other side of the cabin.

According to the invention, apparatus for heating or air conditioning the cabin of a vehicle, comprising two heat exchangers adapted for respective streams of air to pass through them before being delivered to different regions of the cabin, and in which the streams of air are in thermal contact with a hot fluid flowing in two parallel branches of a circuit, the circuit including the said heat exchangers together with regulating means for regulating the flow of the hot fluid in each of the branches in accordance with the desired temperature of the corresponding air stream, is characterised in that each of the branches is sub-divided into a first flow path containing the corresponding heat exchanger and a second flow path in parallel with the first flow path, each said second flow path containing an energy absorbing device for opposing the flow of the fluid with substantially the same resistance thereto as that prevailing in the corresponding said first flow path, the regulating means being adapted to distribute, independently for each of the two said branches, the flow of the hot fluid between the first and second flow paths.

In an apparatus according to the invention, the flow of fluid in each branch is distributed, between the first flow path and the second flow path, without any change in the pattern of this distribution giving rise to any variation in the total flow in the branch. Any such change therefore has no effect on the flow in the other branch.

According to a preferred feature of the invention, the regulating means comprise, for each of the two said branches, a double-acting stop valve which is adapted to enable all of the fluid to flow alternately in the first and second flow paths of that branch in accordance with an adjustable cyclic ratio.

According to another preferred feature of the invention, the first flow paths of the two branches exhaust at a first junction point, the second flow paths exhaust at a second junction point, the first and second junction points both being connected to a third junction point which constitutes the downstream end of both branches.

Preferably, a flow rate limiter is disposed in the fluid circuit in series with both of the said branches, a bypass duct being provided for taking any excess fluid flowing in the circuit as a whole.

In preferred embodiments of the invention, the two stop valves, the two energy absorbing devices, and, where applicable, the flow rate limiter, are integrated into a common valve body having two inlets and three outlets, wherein a first said inlet is disposed upstream of the upstream junction point between the two branches, the second inlet being downstream of the first junction point and upstream of the third junction point, two of the outlets of the valve body being in the two said first flow paths respectively, these outlets being downstream of the stop valves but upstream of the heat exchangers, the third outlet of the valve body being downstream of the third junction point. With this arrangement, where there is a flow rate limiter disposed in the fluid circuit in series with both of the said branches, with a bypass duct being provided for absorbing any excess fluid flowing in the circuit as a whole, the flow rate limiter is preferably disposed within the common valve body, upstream of the junction point between the two branches on the inlet side of the circuit.

The bypass duct may be disposed within the common valve body, so as to connect together the first inlet and the third outlet of the valve body.

Further features and advantages of the invention will appear more clearly on a reading of the following detailed description of a preferred embodiment of the invention, which is given by way of example only and with reference to the accompanying drawing.

BRIEF DESCRIPTION OF THE DRAWING

The single FIGURE of the drawing is a simplified functional diagram for part of an apparatus in accordance with the invention.

DESCRIPTION OF A PREFERRED EMBODIMENT OF THE INVENTION

The apparatus includes, two radiators 1 and 2 for heating streams of air which are to be delivered into the left hand half and the right hand half, respectively, of the cabin of a motor vehicle. The two radiators 1 and 2 may both be combined in a single heat exchanger, through which separate streams of air, juxtaposed to each other, are passed. The radiators 1 and 2 are supplied with a hot fluid through respective inlet ducts 3 and 4, leading from a common inlet duct 5, the remote end of which is for example connected to the cooling circuit of the engine of the vehicle. The inlet ducts 3 and 4 are connected to the downstream end of the common inlet duct 5 at a junction point 6. The streams of fluid leaving the two radiators 1 and 2 join together at a first junction point 7, from which they flow in a common outlet duct 8 to return to the engine.

A first bypass duct 9 is connected at its upstream end to a junction point 10 which is situated between the junction point 6 and the inlet of the radiator 1. A second bypass duct 11 is connected between an upstream junction point 12, in the inlet duct 4 between the junction point 6, and the inlet of the radiator 2. At their downstream ends, these two ducts 9 and 11 meet at a further junction point 13 (referred to as the second junction point). Two further ducts 14 and 15 take the fluid from the junction points 7 and 13 respectively to a further junction point 16 (referred to as the third junction point) at the upstream end of the outlet duct 8.

In order to pass from the junction point 6 to the junction point 16, the fluid can therefore flow along four different flow paths, namely:

(I)—point 10, inlet duct 3, radiator 1, junction point 7, duct 14;

(II)—point 10, bypass duct 9, point 13, duct 15;

(III)—point 12, duct 4, radiator 2, point 7, duct 14; and (IV)—point 12, bypass duct 11, point 13, duct 15.

It will be seen that paths I and II constitute two parallel paths of a first branch of the circuit, while paths III and IV similarly constitute two parallel paths of a second branch, and that these two branches are themselves in parallel with each other. The upstream and downstream ends of the branches are the junction points 6 and 16 respectively.

A double acting stop valve 17, controlled by an electromagnet, is connected between the inlet duct 3 and the first bypass duct 9. In one position, the stop valve 17 permits flow in the flow path I, while in its other position it allows the fluid to flow in the path II. A similar double acting stop valve 18 is mounted between the inlet duct 4 and the second bypass duct 11, and, according to the position of this valve, it selects either flow path III or flow path IV for the fluid. The mean flow rate of the fluid in each of the radiators 1 and 2 is therefore defined by the cyclic ratio of the time during which its associated inlet duct 3 or 4 is open, and this in turn in determined by appropriate control of the associated stop valve 17 or 18. At its extreme position, the double acting stop valve 17 opens one flow path fully while simultaneously closing the other flow path fully, and vise versa. Suitable devices 19 and 20 for absorbing energy are interposed in the bypass ducts 9 and 11 respectively, so that the hydraulic resistance to the flow of fluid in each of the four flow paths is the same. Under these conditions, the fluid flow is distributed constantly and equally between, on the one hand, the flow paths I and II, and on the other hand the flow paths III and IV. As a result, any change in the mean flow rate in one of the radiators 1 or 2 has no effect on the mean flow rate in the other radiator.

In order to render these cumulative flow rates even more regular, a flow rate limiter 21 is fitted upstream of the junction point 6, so as to limit the total flow in the four flow paths, for example to 1000 liters per hour. The excess fraction of the flow received from the engine is diverted into a further bypass duct 22, which connects the common inlet duct 5, upstream of the flow rate limiter 21, directly to the outlet duct 8.

In the embodiment shown in the drawing, the stop valves 17 and 18, the energy absorbing devices 19 and 20, and the flow limiter 21, are all integrated into a single valve body 23, within which the various junction points 6, 10, 12, 13 and 16, together with the ducts 9, 11 and 15, are defined. This valve body has two inlets and three outlets, namely an inlet E1 on the inlet duct 5, upstream of the flow limiter 21, an inlet E2 on the duct 14, two outlets S1 and S2 which are situated respectively on the inlet ducts 3 and 4, and finally an outlet S3 on the outlet duct 8. The bypass duct 22 is outside the valve body 23, but in a modified version it could be incorporated in the latter.

Although three separate junction points 6, 10 and 12 have been described above, two of these, or even all three, could be combined. The same is true for the junction points 7, 13 and 16.

What is claimed is:

1. Apparatus for heating and air conditioning of the cabin of a vehicle, comprising: a fluid circuit defining two branches in parallel; a first heat exchanger adapted for flow of a stream of air through said first heat exchanger, for delivery to a first region of the cabin, and a second heat exchanger adapted for flow of a stream of air through said second heat exchanger, for delivery to a second region of the cabin, each heat exchanger being connected in a respective one of said branches for thermal contact between said fluid flowing in said circuit and said air passing through said heat exchanger; first regulating means connected in a first one of said branches and second regulating means connected in a second branch, for regulating the flow of said fluid in a corresponding branch in accordance with a predetermined value of a required temperature in a corresponding stream of air, wherein each said branch is subdivided into a first flow path comprising said heat exchanger and a second flow path in parallel with said first flow path: said circuit comprising a first junction point between said first flow paths of said two branches at a downstream end of said flow paths; a second junction point between said second flow paths at a downstream end of second flow paths: and a third junction point comprising the downstream end of said two branches, said circuit comprising means connecting the first and second junction points to the third junction point an energy absorbing device in each said second flow path for balancing resistance to flow of said fluid as between the said first flow path and second flow path of said branch concerned, said regulating means being adapted to distribute, independently in each branch, said flow of said fluid as between said first and second flow paths of that branch.

2. Apparatus according to claim 1, wherein each said regulating means comprises a double-acting stop adapted to cause a whole of the flow of said fluid to pass alternately into said first and said second flow paths of said branch concerned in accordance with an adjustable cyclic ratio.

3. Apparatus according to claim 1, further comprising a flow rate limiter disposed in said circuit in series with both said branches, and a bypass duct connected upstream of said flow rate limiter for diverting away from said branches any excess of said flow of said fluid in said circuit.

4. Apparatus according to claim 1, wherein each said regulating means comprises a double-acting stop valve adapted to cause a whole of said flow of said fluid to pass alternately into said first and second flow paths of the branch concerned in accordance with an adjustable cyclic ratio, the apparatus further comprising a common valve body, said stop valves and said energy absorbing devices contained in said valve body, said valve body comprising two inlets and three outlets; said inlets comprising a first inlet upstream of the said branches, and a second inlet downstream of said first junction point and upstream of said third junction point; and said outlets comprising a first outlet in one said branch and a second outlet in the other branch, each of said first and said second outlets being downstream of the corresponding stop valve and upstream of the corresponding heat exchanger; and a third outlet downstream of the said third junction point.

5. Apparatus according to claim 1, further including a flow rate limiter disposed in said circuit in series with both of said branches, and a bypass duct connected upstream of the said flow rate limiter for diverting any excess of said total fluid flow in said circuit, said flow rate limiter being disposed in said common valve body upstream of said branches.

6. Apparatus according to claim 1, further comprising a flow rate limiter disposed in said circuit in series with both of said branches, and a bypass duct connected upstream of said flow rate limiter for diverting any excess of said total fluid flow in said circuit, said bypass duct being disposed within said common valve body, with said bypass duct connecting said first inlet and third outlet.

7. Apparatus according to claim 4, further comprising a flow rate limiter disposed in said circuit in series with both said branches, and a bypass duct connected upstream of said flow rate limiter for diverting away from said branches any excess of said flow of said fluid in said circuit.

8. Apparatus according to claim 4, further including a flow rate limiter disposed in said circuit in series with both of said branches, and a bypass duct connected upstream of the said flow rate limiter for diverting any excess of said total fluid flow in said circuit, said flow rate limiter being disposed in said common valve body upstream of said branches.

9. Apparatus according to claim 4, further comprising a flow rate limiter disposed in said circuit in series with both of said branches, and a bypass duct connected upstream of said flow rate limiter for diverting any excess of said total fluid flow in said circuit, said bypass duct being disposed within said common valve body, with said bypass duct connecting said first inlet and third outlet.

\* \* \* \* \*